C. F. GODDARD.
Grain Binding-Harvesters.

No. 135,985.  Patented Feb. 18, 1873.

2 Sheets--Sheet 1.

Witnesses:
John Becker
C. Sedgwick

Inventor:
C. F. Goddard
PER Munn & Co.
Attorneys.

UNITED STATES PATENT OFFICE.

CHARLES F. GODDARD, OF ST. ANSGAR, IOWA.

IMPROVEMENT IN GRAIN-BINDING HARVESTERS.

Specification forming part of Letters Patent No. 135,985, dated February 18, 1873.

*To all whom it may concern:*

Figure 1:
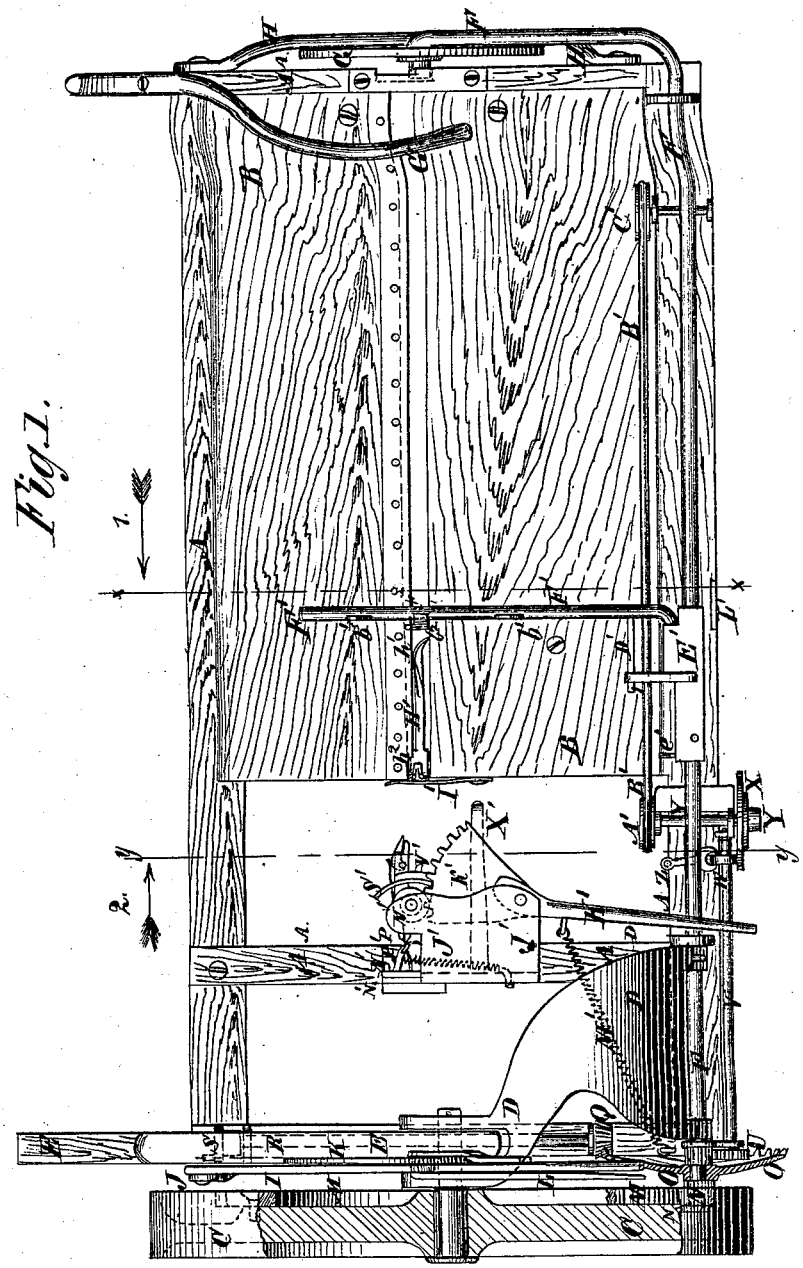
Figure 1:
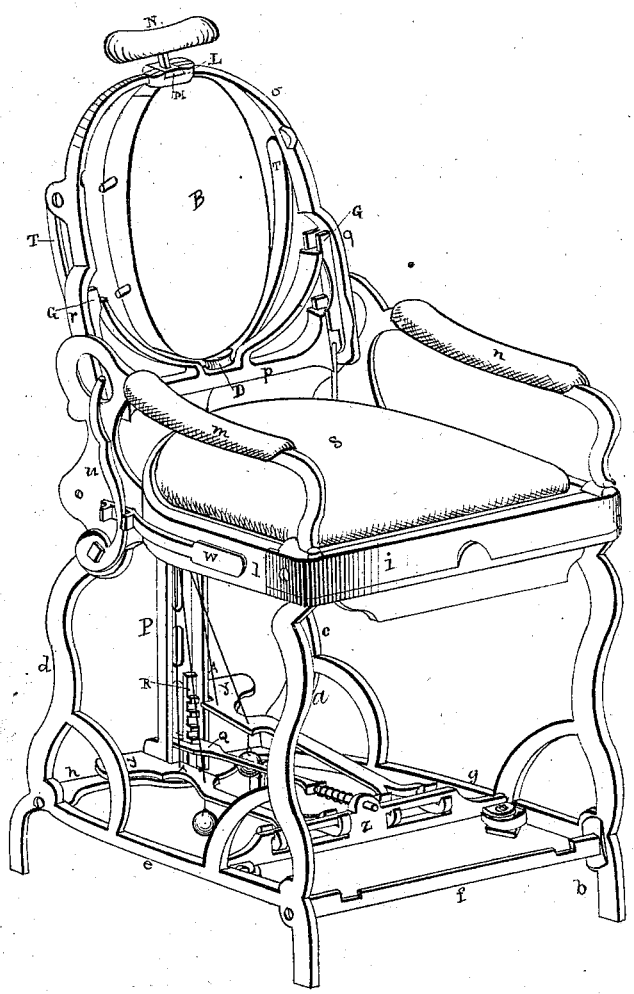

Be it known that I, CHARLES F. GODDARD, of St. Ansgar, in the county of Mitchell and State of Iowa, have invented a new and useful Improvement in Automatic Raking and Binding Attachment for Reapers, of which the following is a specification:

In the accompanying drawing, Figure 1, Sheet 1, is a top view of a harvester, with which my improvements have been connected. Fig. 2, Sheet 2, is a detail cross-section of the same taken through the line $x\ x$, Fig. 1, looking in the direction of arrow 1. Fig. 3, Sheet 2, is a detail cross-section of the same taken through the line $y\ y$, Fig. 1, looking in the direction of arrow 2. Fig. 4, Sheet 2, is a detail under-side view of the binding device, parts being broken away to show the construction. Fig. 5, Sheet 2, is a detail view of the looping-hook.

Similar letters of reference indicate corresponding parts.

My invention has for its object to furnish an improved harvester, which shall be so constructed as to cut the grain, rake it into gavels, and bind it, and which shall be simple in construction, convenient in use, and effective and reliable in operation; and it consists in the construction and combination of the various parts, as hereinafter more fully described.

A represents the frame-work, and B the platform of a harvester. C is the drive-wheel, which revolves upon a journal which is attached to the arm or frame D, and which also pivots the tongue E to said arm or frame. The lower end of the arm or frame D is rigidly attached to a rod, F, which extends along the upwardly-projecting rear edge of the platform B, and works in bearings attached to said platform. The outer end of the rod F at the outer end of the platform B is bent at right angles, extends along said end, and has a small wheel, G, pivoted to its end to support the outer end of said platform B. The wheel G and end of the rod F are protected from the standing grain by a guard, H, attached to the end of the platform B. I is a bent lever which is pivoted to the outer side of the tongue E. To the end of the lower arm of the lever I is pivoted the upper end of the connecting-bar J, the lower end of which is pivoted to the forward part of the platform-frame A. The upper part of the lever I projects across a curved or arched guard, K, and is provided with a spring lever-catch, L, to enter holes in the said guard K, and thus hold the said lever securely in any position into which it may be adjusted. By this arrangement, by operating the lever I the platform may be conveniently raised and lowered to adjust the machine for cutting the grain at any desired height from the ground, or to pass from place to place. To the inner side of the drive-wheel C is attached, or upon it is formed, a gear-wheel, M, into the teeth of which mesh the teeth of the small gear-wheel N, which runs loosely upon the end of the rod F, and with which is rigidly connected the larger bevel or crown wheel O and the small gear-wheel P. The teeth of the larger central gear-wheel O mesh into the teeth of the small gear-wheel Q attached to the cross-shaft R, which revolves in bearings attached to the frame A, and to its forward end is attached the small crank-wheel S, by which the sickle-bar is driven. The teeth of the inner gear-wheel P mesh into the teeth of the gear-wheel U attached to the end of the shaft V, which revolves in bearings attached to the rear side of the frame A, and upon the other end of which is placed a small friction or bevel-gear wheel, W, which drives the friction or bevel-gear wheel X attached to the rear end of the short shaft Y. The wheel W slides upon the shaft V, so that by operating a small lever, Z, it may be thrown out of and into gear with the wheel X, when desired. To the forward end of the shaft Y is attached a chain-wheel, A', around which passes an endless chain, B', which also passes around a chain-wheel, C', at the outer or grain end of the platform B. To the endless chain B' is attached an arm, D', in such a way as not to interfere with the said chain in passing around the chain-wheels A' C', and which is pivoted to the block E', to which the rake-head F' is rigidly attached. The rake-head F' is provided with teeth or fingers $b^1$, by which the grain is swept from the platform B, as it is carried forward along the lower part of the endless chain B'. As the rake completes its stroke, and the point of the chain B', at which the arm D' is attached, rises around the chain-wheel A', the rake-head F' $b^1$ is raised so that it is carried back above the falling grain to be again lowered to 2. The arm H' h¹, cross-head O', and hook P' combined with rake-head F' having hook B, and slide E having pin e', substantially as herein shown and described, and for the purpose set forth.

3. The combination of the pivoted spring-guide S' and incline U' with the lever K and cross-head O' to control the movement of said cross-head as it revolves, substantially as herein shown and described, and for the purpose set forth.

CHARLES F. GODDARD.

Witnesses:
  P. HARMON,
  CHARLES H. OWEN.

P. HABERSTICH.
Barbers' Chairs.

No. 135,986.

3 Sheets--Sheet 1.

Patented Feb. 18, 1873.